(12) United States Patent
Min et al.

(10) Patent No.: US 8,171,055 B2
(45) Date of Patent: May 1, 2012

(54) SYSTEM AND METHOD FOR GENERATING COMMUNICATION SUBSCRIBER DESCRIPTION INFORMATION

(75) Inventors: Guobing Min, Shenzhen (CN); Jieping Zhong, Shenzhen (CN); Fangshan Wang, Shenzhen (CN); Qi Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 512 days.

(21) Appl. No.: 12/367,257

(22) Filed: Feb. 6, 2009

(65) Prior Publication Data

US 2009/0144306 A1 Jun. 4, 2009

Related U.S. Application Data

(63) Continuation of application No. PCT/CN2007/000790, filed on Mar. 12, 2007.

(30) Foreign Application Priority Data

Aug. 7, 2006 (CN) .......................... 2006 1 0104256

(51) Int. Cl.
*G06F 17/30* (2006.01)
(52) U.S. Cl. ........................................ 707/796
(58) Field of Classification Search .................. None
See application file for complete search history.

(56) References Cited

U.S. PATENT DOCUMENTS

| 5,794,050 A | 8/1998 | Dahlgren et al. |
| 7,822,188 B1* | 10/2010 | Kirchhoff et al. ........ 379/211.02 |
| 7,979,802 B1* | 7/2011 | Appelman .................... 715/752 |
| 2002/0173971 A1 | 11/2002 | Stirpe et al. |
| 2006/0005113 A1 | 1/2006 | Baluja et al. |
| 2006/0106876 A1 | 5/2006 | MacGregor |
| 2007/0130023 A1* | 6/2007 | Wolinsky et al. ............... 705/26 |
| 2010/0070448 A1* | 3/2010 | Omoigui ......................... 706/47 |

FOREIGN PATENT DOCUMENTS

| CN | 1771712 A | 5/2006 |
| CN | 100558045 C | 2/2008 |
| WO | WO 2004/102417 A1 | 11/2004 |
| WO | WO 2004/102925 A1 | 11/2004 |

OTHER PUBLICATIONS

European Office Action (Mar. 19, 2010).
Written Opinion of the International Searching Authority in corresponding PCT Application No. PCT/CN2007/000790 (Jul. 5, 2007).

* cited by examiner

*Primary Examiner* — Bai D. Vu
(74) *Attorney, Agent, or Firm* — Leydig, Voit & Mayer, Ltd.

(57) ABSTRACT

A system for generating communication subscriber description information includes an information labeling unit adapted to label original information of a specific communication subscriber, and a subscriber information generating unit adapted to generate communication subscriber description information according to communication records. A method for generating communication subscriber description information applies Ontology in the communication field, so as to obtain subscriber demand information for generating communication subscriber description information by analyzing actual communication records of the subscriber. Moreover, the generated communication subscriber description information truly reflects characteristics and requirements of the communication subscriber, thus ensuring the accuracy of the generated communication subscriber description information. The present invention is applicable to communication behaviors such as voice communication, data communication, and short messages of a subscriber.

9 Claims, 5 Drawing Sheets

SYSTEM AND METHOD FOR GENERATING COMMUNICATION SUBSCRIBER DESCRIPTION INFORMATION

CROSS-REFERENCE TO RELATED APPLICATIONS

This application is a continuation of International Patent Application No. PCT/CN2007/000790, filed Mar. 12, 2007, which claims priority to Chinese Patent Application No. 200610104256.2, filed Aug. 7, 2006, both of which are hereby incorporated by reference in their entirety.

FIELD OF THE TECHNOLOGY

The present invention relates to a communication information collection technology, and more particularly to a system and a method for generating communication subscriber description information.

BACKGROUND

With the development of modern communication technology, people can communicate with each other in many diversified ways, from fixed-line phones and mobile phones for voice communication, to Emails and mobile Emails mainly for text communication, to instant messages (IMs) which combine voice, text, and even image communication; and from the BBS Forums of Web1.0 to the multimedia-filled Blogs of Web 2.0. Meanwhile, various communication modes are becoming gradually integrated. For example, a subscriber can now conduct voice communication, Email sending and receiving, and IM communication all through one mobile terminal. In addition, one can even achieve information communication through various data services like mobile Blogs, picture Blogs, and Podcasts.

Relevant data show that, under current conditions, on average 170 million call records are produced each month in a district with 700,000 GSM subscribers. This interpersonal communication builds a huge social relationship network, and at the same time, such communication contains abundant communication subscriber description information reflecting the characteristics and requirements of the subscribers. For example, when a subscriber regularly dials the service hotline of a securities company, it can be deduced that the subscriber is possibly a shareholder. Thus products about investment and financing might well interest the subscriber. Therefore, certain attributes of the securities company can be transferred to the subscriber. In today's user-centered society, one extremely significant issue is how to obtain communication subscriber description information.

In another aspect, Ontology has become a hot-point in research at home and abroad, and its applications appear in various fields. The study of Ontology is focused on knowledge engineering, ontology engineering, information organization and retrieval, and semantic Web. Various ontology languages and ontology creation tools are being gradually developed and utilized. For example, Protégé is a free and open-source ontology editor and knowledge management platform developed by Medical Information Center of Stanford University School of Medicine. Jena is a development kit from the HP Company for the application of semantic network-oriented ontology parsing and rule reasoning, and its content is comprehensive. As for ontology languages, Web Ontology Language (OWL) has become a recommended standard for World Wide Web Consortium (W3C). It has become a trend to use Ontology in traditional and emerging industries.

Ontology is applied in the communication world to describe the attribute characteristics of each communication subject using ontology languages, thereby capturing the transferring of the attribute characteristics in a social network. This is significant for obtaining the description information of subscribers functioning as main communication subjects.

Besides launching a 1 G mailbox to serve the subscribers, the Gmail service of Google company further built a subscriber relationship network through recommendations among net-friends, so as to obtain information such as social relationships of the subscribers, thereby generating some communication subscriber description information. In the early stage, new subscribers of Gmail could only obtain mailbox accounts through the invitations of old subscribers. Thereby, a social network is built by social relationship attributes of the subscribers collected through invitation authorities among net-friends. However, in practice, an old subscriber of Gmail may not only invite his friends. When Gmail first appeared, many Gmail owners sold their invitation authority in public on the Internet, and after Gmail became popular, it became easy to obtain Gmail invitations through the Internet. As a result, the social relationship information built on the basis of invitation authorities is not accurate. In other words, the generated communication subscriber description information is inaccurate.

Another method for generating communication subscriber description information is shown below. The Email sending and receiving records of a subscriber are analyzed by a server to obtain the information of which type of Email addresses the subscriber contacts, and thus the subscriber description information can be generated according to the Email addresses information. However, Email providers can only build a simple contact network by analyzing the Email sending and receiving records. Such inadequate communication subscriber description information may not truly reflect the characteristics and requirements of the subscriber, and thus is inaccurate.

SUMMARY

Accordingly, an embodiment of the present invention provides a system for generating communication subscriber description information. The system can automatically generate communication subscriber description information, so as to ensure the accuracy of the generated communication subscriber description information.

An embodiment of the present invention also provides a method for generating communication subscriber description information. The method can automatically generate communication subscriber description information, so as to ensure the accuracy of the generated communication subscriber description information.

As embodied and broadly described herein, the present invention further provides the following technical scheme.

A system for generating communication subscriber description information is provided, including (1) an information labeling unit adapted to label original information of a specific communication subscriber, and (2) a subscriber information generating unit adapted to generate communication subscriber description information.

The information labeling unit includes a labeling module, an original resource database, an application template ontology library, and a specific subscriber labeling library.

The original resource database is adapted to record the original information of a subscriber to be labeled.

The application template ontology library is adapted to build and store an application template describing a class and class attributes of the application for different applications. The class and class attributes come from a public or self-defined ontology in an industrial application field.

The labeling module is adapted to obtain the original information of a subscriber to be labeled from the original resource database, call an application template corresponding to the class from the application template ontology library according to the class of the original information, and fill information corresponding to the application template in the original information into the application template so as to label the original information, and store the labeled original information in the specific subscriber labeling library.

The subscriber information generating unit includes a subscriber information generating module, a subscriber information base, a strategy pool, and a strategy setting module.

The subscriber information generating module is adapted to obtain communication and record information externally, query the specific subscriber labeling library, and according to the information transferring strategy of an unspecific subscriber in the strategy pool, add a qualified contact party ID information into the communication subscriber description information of a communication subject and store the communication subscriber description information in the subscriber information base; or according to the information transferring strategy of a specific subscriber in the strategy pool, add a qualified contact party ID information and the corresponding subscriber labeled information of the contact party ID information stored in the specific subscriber labeling library into the communication subscriber description information of a communication subject, and store the communication subscriber description information in the subscriber information base.

The strategy setting module is adapted to set and store various subscriber information transferring strategies into the strategy pool.

The strategy pool is adapted to store and provide various subscriber information transferring strategies for the subscriber information generating module.

The subscriber information base is adapted to store subscriber description information files of communication subjects.

The system further includes a preprocessing unit adapted to preprocess communication records, and the preprocessing unit includes a record preprocessing module and a new record library.

The record preprocessing module is adapted to extract a preset target field from fields of the externally obtained communication record information, generate an additional field after processing the communication records according to a preset requirement, and store a new record composed of the target field and the additional field.

The new record library is adapted to store target fields and additional fields to compose new communication records for the subscriber information generating module.

The information labeling unit further includes a self-service module adapted to provide a subscriber interface, so as to update labeling results in the specific subscriber labeling library through the labeling module by the self-service module.

The self-service module is an operating platform, or a client in a client/server (C/S) architecture, or a client in a browser/server (B/S) architecture.

The labeling module further includes a mapping table between fields in the application template and their corresponding ambiguous fields.

The labeling module further includes a split function for analyzing the ambiguous fields corresponding to the fields in the application template so as to extract a key field.

The application template includes an application template name and application template parameters describing the class attributes of the class indicated by the application template name. The application template name is identical to the name of the class.

The application template further includes association relationships between different classes.

A method for generating communication subscriber description information includes presetting a subscriber information transferring strategy for determining whether or not to add contact party information into the communication subscriber description information of a communication subject. The method further includes (1) obtaining the communication record information, and determining whether the contact party ID information in the communication record information exists in the generated subscriber labeled information; (2) if the contact party identification (ID) information in the communication record information dose not exist in generated subscriber labeled information, according to an information transferring strategy of an unspecific subscriber in the preset subscriber information transferring strategy, recording the qualified contact party ID information in the communication record information into the communication subscriber description information of the communication subject, and ending the process; and (3) if the contact party identification (ID) information in the communication record information exists in generated subscriber labeled information, according to the information transferring strategy of a specific subscriber in the preset subscriber information transferring strategy, recording the qualified contact party ID information in the communication record information and the subscriber labeled information corresponding to the contact party ID information into the communication subscriber description information of the communication subject.

An application template describing a class and class attributes of the application is respectively preset for different applications, and the method for generating the subscriber labeled information includes (1) extracting an original resource data record, and obtaining the class name of the class of the original resource data record; (2) calling an application template corresponding to the class name according to the obtained class name, and recording a corresponding field value in the record into the application template according to the fields contained in the called application template; and (3) storing the application template after recording.

If parts of the fields in the application template do not exist in the original resource data record, the method for recording the corresponding field value in the original resource data record into the application template is setting the field value in the application template as null.

If parts of the fields in the application template do not exist in the original resource data record, the method for recording the corresponding field value in the original resource data record into the application template includes (1) presetting a mapping table between the fields in the application template and their corresponding ambiguous fields; and (2) querying the mapping table to determine whether the ambiguous field of the field in the application template exists in the original resource data record, and if the ambiguous field of the field in the application template exists in the original resource data record, analyzing and extracting a key field from the ambiguous field, and recording the key field in the corresponding field of the application template; otherwise, setting the value of the field in the application template as null.

The method for analyzing and extracting a key field is split analysis.

If the field described in the conditions of the subscriber information transferring strategy does not exist in the obtained communication record information, before determining whether the contact party ID information in the communication record information exist in the generated subscriber labeled information, the method further includes extracting a preset target field from the fields of the obtained communication record and generating an additional field after processing the communication record information according to a preset requirement, so as to form and restore new communication record information.

If the contact party ID information in the communication record information exists in the generated subscriber labeled information, a method for recording the subscriber labeled information includes (1) traversing preset preferential attributes in the subscriber description information of a communication subject subscriber, determining whether the class of the subscriber labeled information exists in the preferential attributes, and if the class of the subscriber labeled information does not exist in the preferential attributes, adding the class of the subscriber labeled information and transferable parameters therein into the preferential attributes of the communication subject subscriber; and further determining whether the transferable parameters in the subscriber labeled information exist in the preferential attributes, if the transferable parameters in the subscriber labeled information exist in the preferential attributes, the process ends; otherwise, the transferable parameters in the subscriber labeled information are added into the preferential attributes.

The method further includes: in the communication subscriber description information, building contact frequency or intimacy between the communication subject and an unspecific subscriber or a specific subscriber according to a preset composite operation relationship of a designated field.

The application template is created on the basis of an Ontology Language.

The application template includes an application template name and application template parameters describing related class attributes of the class indicated by the application template name.

Seen from the above technical scheme, the present invention obtains subscriber demand information for generating communication subscriber description information through applying Ontology in the communication field and analyzing actual communication records of the subscriber. Moreover, the generated communication subscriber description information truly reflects characteristics and requirements of communication subscribers, thus ensuring the accuracy of the generated communication subscriber description information.

The present invention is applicable to communication behaviors such as voice communication, data communication, and short messages of a subscriber.

DETAILED DESCRIPTION

Embodiments of the present invention include: presetting a subscriber information transferring strategy, obtaining communication record information, and determining whether a contact party identification (ID) information in the communication record information exists in generated subscriber labeled information. If the contact party identification (ID) information in the communication record information does not exist in generated subscriber labeled information, the qualified contact party ID information in the communication record information is recorded, according to an information transferring strategy of an unspecific subscriber in the preset subscriber information transferring strategy, into the communication subscriber description information of a communication subject. If the contact party identification (ID) information in the communication record information exists in generated subscriber labeled information, the qualified contact party ID information in the communication record information and the subscriber labeled information corresponding to the contact party ID information is recorded, according to an information transferring strategy of a specific subscriber in the preset subscriber information transferring strategy, into the communication subscriber description information of the communication subject.

In order to make the objectives, technical scheme, and advantages of the present invention comprehensible, exemplary embodiments accompanied with figures are described in detail below.

The present invention is applicable to communication behaviors such as voice communication, data communication, and short messages of a subscriber. Voice communication is taken as an example below for describing the whole realizing process.

Figure 1:
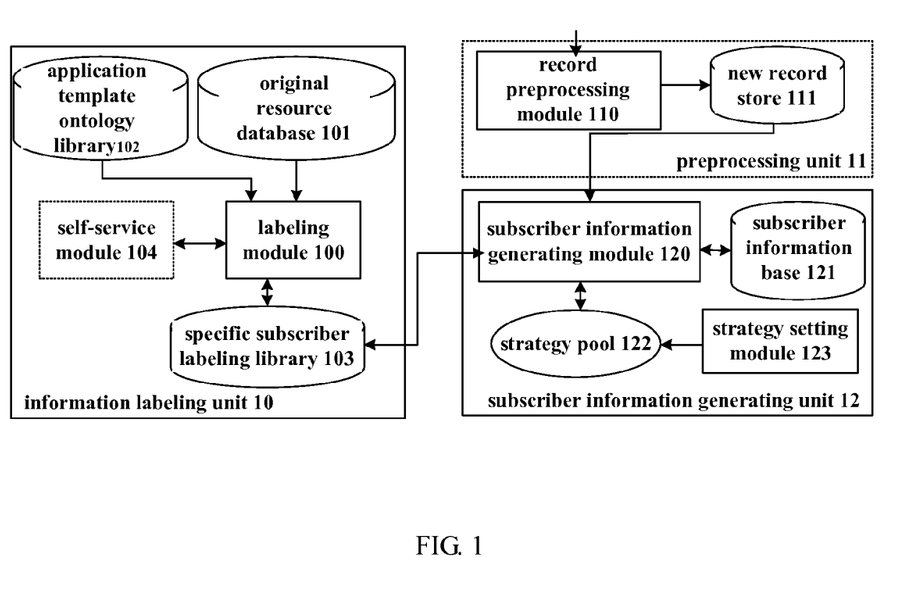
FIG. 1 is a schematic diagram showing the configuration of a system for generating communication subscriber description information according to an embodiment of the present invention.

FIG. 1 is a schematic diagram showing the configuration of a system for generating communication subscriber description information according to an embodiment of the present invention. The embodiment of the system of the present invention includes an information labeling unit 10 adapted to label original information of a specific communication subscriber, and a subscriber information generating unit 12 adapted to generate communication subscriber description information according to communication records. The communication subscriber hereinafter is referred to as subscriber for short. The composition of the units and connections therebetween will be illustrated in detail below.

Firstly, the information labeling unit 10 includes a labeling module 100, an original resource database 101, an application template ontology library 102, and a specific subscriber labeling library 103.

The original resource database 101 is adapted to record the original information of a subscriber to be labeled. The original information includes ID information and attributes describing the subscriber. For example, original data of an enterprise registered in the yellow pages; such as the class of the enterprise, enterprise name, telephone number, service introduction, district, address, fax, postcode, address, and Email. The class records leaf nodes of the trade catalog of the company, the telephone number of the company functions as the ID information, and the rest of the parameters serve as the attribute description information. It should be noted that, the specific subscriber herein refers to a labeled communication subscriber.

For example, in an IM communication network, IM numbers are further classified as enterprise subscribers and ordinary subscribers, and thus the original resource database refers to information records of an IM enterprise subscriber. The same processing mode can be applied to services with numbers like Email.

The application template ontology library 102 is adapted to build and store an application template describing a class and class attributes of an application for different applications. The class and class attributes come from a public or self-defined ontology in an industrial application field. In particular, directing to different applications, large classes, sub-classes thereof, ontology of class attributes are built according to the classification manner of the original resource data, and relationships between the classes and associations between the class attributes are defined. Meanwhile, the relationship between the classes and class attributes is defined to point out class attributes for describing each class and subclasses thereof, and an application template of the class is deduced by the relationship. It should be noted that, if the original resource data has not been classified, it can be done manually, and meanwhile ontology of the class library is created. Herein, the application template is created on the basis of an Ontology Language. The creation method adopts a current technology, and can be accomplished by many current ontology creation tools. For example, Protege platform mentioned in the background of the invention, which will not be described in detail herein again.

An application template includes two parts: an application template name for identifying the class of the application template, and application template parameters describing the class attributes of the class indicated by the application template name. The application template name is identical to the name of the class. When the application template parameters are set, each application template parameter is corresponding to a type tag. The application template parameters can be classified into transferable parameters and non-transferable parameters, or even more specified types. When a parameter is set as a transferable parameter, the parameter can be transferred to the subscriber as a subscriber description information record.

Due to different characteristics, each industry needs specific application template parameters to describe its attributes. For example, in the auto industry, attributes of brands are employed for identifying auto models run or manufactured by a company. While in the restaurant industry, the attributes of brands may not exist, parameters describing the taste and decoration style are more often used. Therefore, different application templates can be set directing to leaf nodes of the classified catalog of different industries. Each application template has a uniquely allocated template name and application template parameter description directing to the industry having the leaf node.

An application template of the auto sales class is taken as an example below, for illustrating possible application template parameters of a specific subscriber in the auto sales. Referring to Table 1:

TABLE 1

Application template name: Auto Sales
Contained application template parameters
Group 1: Basic Attributes (Inherent Attributes)
Company name:   Telephone number:
Address:        City:
Postcode:       Website:
Group 2: Extended Attributes (Service Attributes)
Brands: such as BMW, CITROEN, FVW, etc
Services: such as auto sales, auto insurance, auto maintenance, etc Table 1 describes possible content in an application template of auto sales in words. The parameters in practice implementation are set according to actual circumstances, which include, but is not limited to, the content of Table 1.

In practice, Ontology Language, for example, Web Ontology Language (OWL) can be used to describe and record an application template, and the detail of such description is well known in the art. The present invention emphasizes the creation of specific application templates for different applications (classes).

The application template not only labels various application template parameters for classes, but also builds association relationships between different classes. For example, the association relationship between the auto sales in the auto class and the petrol sales in the chemical industry class can be built, which means the subscriber of auto sales may also be the subscriber of petrol sales at the same time. This transitive relationship may well contribute to the collection of subscriber attributes.

The labeling module 100 is a logic processing module of the information labeling unit 10, adapted to label the original information of a subscriber. The original information of a subscriber to be labeled is obtained from the original resource database 101. According to the class of the original information, an application template corresponding to the class is invoked from the application template ontology library 102. An application template name and parameter values of the application template parameter items corresponding to the application template in the original information are filled into the application template, so as to obtain the specific subscriber information, and store the obtained specific subscriber information in the specific subscriber labeling library 103.

When labeling the attributes of a specific subscriber, different application templates can be invoked to label the specific subscriber information directing to subscribers in different types of industries.

The specific subscriber labeling library 103 is adapted to store the labeled specific subscriber information.

The labeled specific subscriber information includes, but is not limited to, ID information of a specific subscriber such as telephone number, application template name of the specific subscriber, and description information of the specific subscriber. The description information of the specific subscriber includes, but is not limited to, basic attributes and extended attributes. The specific subscriber information is stored in the specific subscriber labeling library 103 in a feasible storage manner. Table 2 shows an embodiment of the stored specific subscriber information:

TABLE 2

```
<Specific Subscriber 1>
<ID Number></ID Number>
<Template Name>Auto Sales</Template Name>
<Attribute Parameters>
    <Group 1:   Basic Attributes>
        <Enterprise Name></Enterprise Name>
        <District></District>
        <Address></Address>
        <Postcode></Postcode>
        <Website></Website>
    </Group 1:   Basic Attributes>
    <Group 2:   Extended Attributes>
        <Brand></Brand>
        <Service item></Service item>
    </Group 2:   Extended Attributes>
</Attribute Parameters>
</Specific Subscriber 1>
```

The information labeling unit 10 further includes a self-service module 104 adapted to provide a subscriber-oriented interface, so as to facilitate the subscriber to update labeling results in the specific subscriber labeling library 103 through the labeling module 100 by using the self-service module 104. If the subscriber is a system manager, the self-service module 104 serves as an operating platform like system interface. If the subscriber is a labeled subscriber, a client/server (C/S) architecture is adopted, in which the self-service module 104 serves as a client, and the labeling module 100 and the specific subscriber labeling library 103 serve as a server. After logging on the server through the client, the labeled subscriber can modify the labeled self-information through operations such as registration, logon, or information update at the client. Herein, as the C/S structure is a commonly-used architecture at present, and belongs to a technology known to those skilled in the art, so the details will not be described herein again. Further, the self-service module 104 may also be implemented as a client in a browser/server (B/S) architecture.

Secondly, the subscriber information generating unit 12 includes a subscriber information generating module 120, a subscriber information base 121, a strategy pool 122, and a strategy setting module 123.

The subscriber information generating module 120, a core module in the system of the present invention, is adapted to determine whether or not and how to generate the communication subscriber description information according to a subscriber information transferring strategy queried and invoked from the strategy pool 122, and further store the generated communication subscriber description information into the subscriber information base.

The subscriber information generating module 120 obtains communication record information externally, and queries the specific subscriber labeling library 103 to determine whether communication objects in the communication records, i.e., ID field values of the contact parties, are stored in the specific subscriber labeling library 103. If communication objects are not stored in the specific subscriber labeling library 103, qualified contact party ID information is added, according to an information transferring strategy of an unspecific subscriber in the subscriber information transferring strategy, into the communication subscriber description information of a communication subject, and the communication subscriber description information is further stored in the subscriber information base 121. If communication objects are stored in the specific subscriber labeling library 103, qualified contact party ID information and the corresponding subscriber labeled information of the contact party ID information stored in the specific subscriber labeling library 103 are added, according to an information transferring strategy of a specific subscriber in the subscriber information transferring strategy, into the communication subscriber description information of a communication subject, and the communication subscriber description information is further stored in the subscriber information base 121.

If the communication object is a specific subscriber in the specific subscriber labeling library, the subscriber labeled information is added into the subscriber information base 121, that is, a preferential attribute is recorded in the communication subscriber description information of the communication subject. If the preferential attribute already exists, the preferential attribute information is adjusted, for example, to add in new transferable parameters or alter the corresponding weights of the parameters. If the preferential attribute already does not exist; the preferential attribute information is added.

Herein, the communication subject refers to a home subscriber of a communication record, for example, a calling party number subscriber in a calling party bill record, and thus the communication subject is identified by the subscriber number fields in the bill record.

The strategy setting module 123 is a system-manager-oriented management interface, for setting various subscriber information transferring strategies. In practice, different classes have specific characteristics, so different subscriber information transferring strategies should be set. The already set subscriber information transferring strategies are stored in the strategy pool 122.

The subscriber information transferring strategy includes conditions for building attributes of an unspecific subscriber and conditions for building attributes of a specific subscriber. Here, the unspecific subscriber, relative to the specific subscriber, refers to a subscriber not existing in the specific subscriber labeling library 103. According to the conditions for building attributes of an unspecific subscriber, it is determined whether or not to add the unspecific subscriber into the communication subscriber description information of a communication subject. According to the conditions for building attributes of a specific subscriber, it is determined whether or not to add the specific subscriber into the communication subscriber description information of a communication subject.

The subscriber information transferring strategy is a description combination of field value restrictions, and the fields here come from the communication records. A subscriber information transferring strategy can be expressed in Formula (1) as follows:

$$I=\{Q_1 \cap Q_2 \cap \ldots \cap Q_n\}(n>=1) \qquad (1)$$

In Formula (1), I represents the content of a subscriber information transferring strategy, Q represents different field values, i.e., restrictions, and $\cap$ represents an AND relationship between the previous and succeeding restrictions. As shown in Formula (1), it is considered qualified to meet the subscriber information transferring strategy only when all the restrictions $Q_1$-$Q_n$ are satisfied. It should be noted that, Formula (1) is only one way of expressing the subscriber information transferring strategy, and the relationship between the previous and succeeding restrictions can also be OR, or partially AND while partially OR, which will not be illustrated in detail herein again.

Table 3 shows the content and definitions of subscriber information transferring strategies for specific subscribers with application template names as auto sales class and auto maintenance class:

TABLE 3

| Application template name | Content of subscriber information transferring strategy | Meanings |
|---|---|---|
| Auto sales | $I_1 = \{$(the number of calls $>1)\}$ | The transferable information of any auto sales contact party making more than one call will be recorded in the communication subscriber description information of a communication subject. |
| Auto maintenance | $I_2 = \{$(the number of calls $> 3) \cap$ (total call duration $>$ 00:15:00)$\}$ | Only the transferable information of an auto maintenance contact party who makes more than three calls and with the total call duration exceeding 15 minutes will be recorded in the communication subscriber description information of a communication subject. |

The strategy pool 122 is adapted to store and provide various subscriber information transferring strategies for the subscriber information generating module. In the strategy pool 122, one application template name is corresponding to one subscriber information transferring strategy. The subscriber information generating module 120 queries and invokes the corresponding subscriber information transferring strategy in the strategy pool 120 according to the application template name of the original resource data.

The subscriber information base 121 is adapted to store the subscriber description information file of a communication subject. The subscriber description information file includes, but is not limited to, identification IDs, social relationship attributes, and preferential attributes of the subscriber.

The social relationship attributes record unspecific subscribers, specific subscribers, and contact weight between subscribers who meet the conditions for building the social relationships. The contact weight is a parameter showing the degree of relationship between the subscribers, and can be obtained by certain combination operations based on a specific field, so as to present the contact frequency or intimacy between the communication subject and unspecific or specific subscribers. A combination operation is taken here as an example. Assuming that the contact weight is represented by S and the specific field set by the system is represented by P, Formula (2) is obtained as follows:

$$S = f(P_1, P_2, \ldots, P_n) = \frac{P_m}{\sum_{i=1}^{n} P_i}, n >= m >= 1 \quad (2)$$

The preferential attributes are mainly formed by transferable parameters of different application templates, for describing characteristics of specific subscribers in already built social relationships. After meeting the conditions for building social relationships, the characteristics are transferred to the communication subject for describing the communication subscriber description information of the communication subject. Table 4 shows an example of a subscriber information record. Subscriber 1 represents a communication subject. The communication subscriber description information of the communication subject includes information of an unspecific subscriber 1, an unspecific subscriber 2, a specific subscriber 1, and a specific subscriber 2. The preferential attributes are formed by transferable parameters of an application template 1 and an application template 2, for describing characteristics of the specific subscriber 1 and the specific subscriber 2 in already built social relationships.

TABLE 4

```
<subscriber 1>
    <number></number>
    < social relationship attributes>
    <unspecific subscriber>
        <unspecific subscriber 1>
            <number></number>
            <contact weight></contact weight>
        </unspecific subscriber 1>
        <unspecific subscriber 2>
            <number></number>
            <contact weight></contact weight>
        </unspecific subscriber 2>
    </unspecific subscriber>
    <specific subscriber>
        <specific subscriber 1>
            <number></number>
            <name></name>
            <contact weight></contact weight>
        </specific subscriber 1>
        <specific subscriber 2>
            <number></number>
            <name></name>
            <contact weight></contact weight>
        </specific subscriber 2>
    </specific subscriber>
    </ social relationship attributes>
    <preferential attribute>
        <application template 1>
            <template name>auto sales </template name>
            <transferable parameter a></transferable parameter a>
            <transferable parameter b></transferable parameter b>
        </application template 1>
        <application template 2>
            <template name>yacht sales</template name>
            <transferable parameter a></transferable parameter a>
            <transferable parameter b></transferable parameter b>
        </application template 2>
    </preferential attribute>
</subscriber 1>
```

In practice, the information labeling unit 10 and the subscriber information generating unit 12 can be two independent servers.

Further, if the communication record information obtained externally by the subscriber information generating module 120 does not include the fields described in the restrictions of the subscriber information transferring strategy, the system of the present invention further includes a preprocessing unit 11 adapted to preprocess the communication records. In particular, a preset target field is extracted from the fields of the original communication record to form a new record, and the new record is stored. The target field at least includes a communication subject ID field identifying the owner of the communication record, a contact party ID field identifying the communication objects, and an additional field generated by processing the communication record according to preset requirements.

The preprocessing unit 11 mainly includes a record preprocessing module 110 and a new record library 111.

The record preprocessing module 110 is adapted to preprocess the externally obtained communication record information, extract a preset target field from the fields of the original communication record to form a new record, and store the new record. Meanwhile, the new record further includes an additional field generated by processing the communication record according to preset requirements. The new communication record composed of the target field and the additional field is stored in the new record library 111.

Herein, take the preprocessing of an externally obtained original phone bill as an example for illustration. Table 5 shows an original phone bill record, including subscriber number, serial number, place of the call, type of the calling/called party, type of the call, counterpart's number, date of the call, time of the call, duration of the call, mobile phone charge, and toll call charge. It is assumed that the preset target fields are subscriber number, serial number, counterpart's number, the number of calls, and total call duration. Seen from Table 5, the subscriber number, serial number, and counterpart's number can be directly extracted from the original phone bill record. However, the number of calls and total call duration do not exist in the original phone bill record, and can be obtained by consolidating the same bill records, i.e., consolidating bill records with the same contact party ID field values, which refer to bill records with the same counterpart's number. Further, the consolidation here actually means summation. For example, the total call duration of a counterpart's number A can be obtained by merely adding together the call duration in each record under the counterpart's number A in the original phone bill record.

TABLE 5

Original Phone Bill Record

| Subscriber number | Ser. No. | Place of the call | Type of the calling/called party | Type of the call | Counterpart's number | Date of the call | Time of the call | Duration of the call | Mobile phone charge | Toll call charge |
|---|---|---|---|---|---|---|---|---|---|---|

The new record library 111 is adapted to store the preprocessed communication records, and the subscriber information generating module 120 obtains the required communication records from the new record library 111. The record fields are target fields preset by the record preprocessing module 110. According to the above example, the bill records preprocessed and stored in the new record library 111 are shown in Table 6:

TABLE 6

Preprocessed communication records

| Subscriber number | Ser. No. | Place of the call | Type of the calling/called party | Number of calls | Total call duration |
|---|---|---|---|---|---|

In Table 6, the subscriber number field means that the bill record belongs to the communication subscriber corresponding to the subscriber number, number of calls represents the total entries in the same bill, and the total call duration refers to the sum of call durations in the same bill.

Figure 2:
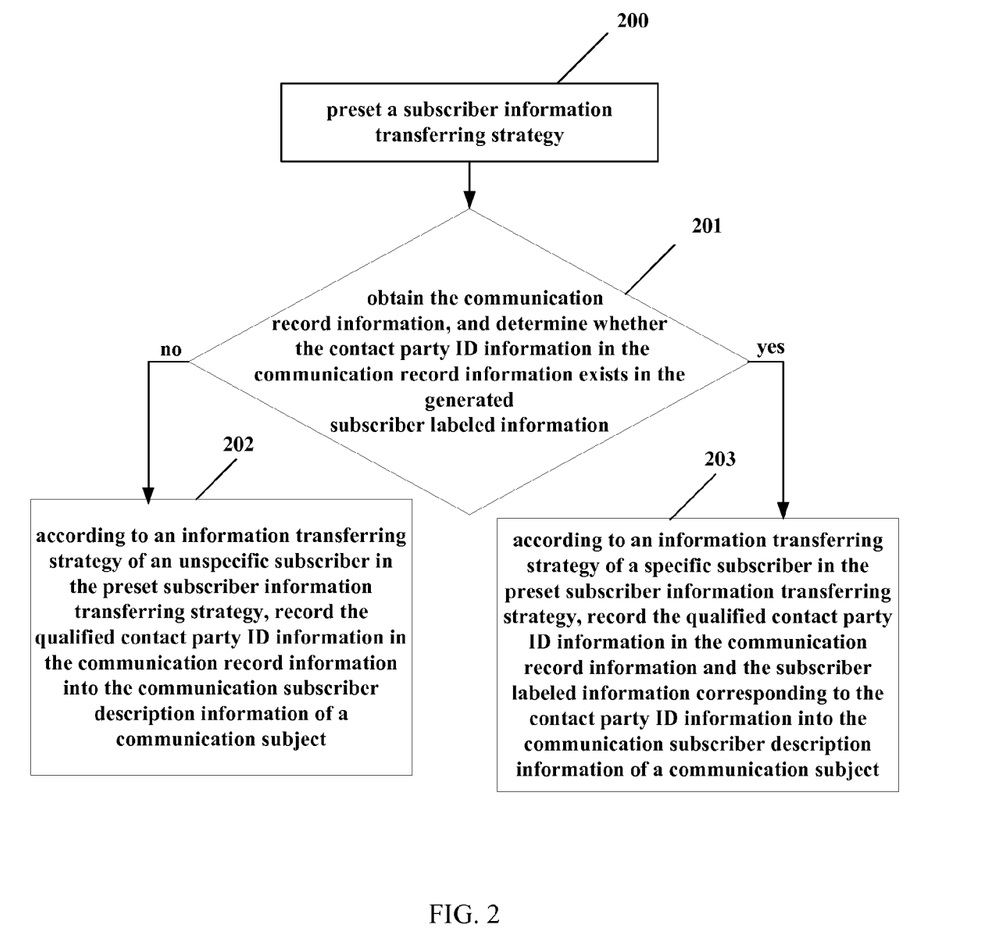
FIG. 2 is a flow chart of a method for generating communication subscriber description information according to an embodiment of the present invention.

The system for generating communication subscriber description information provided by the embodiment of the present invention is described above, and the method for generating communication subscriber description information according to the present invention will be described in detail below accompanied by FIG. 1. FIG. 2 is a flow chart of the method for generating communication subscriber description information according to an embodiment of the present invention. The method can be controlled and implemented by a preset timer, or performed under the command from a background manager. The method mainly includes the following blocks.

Block 200: a subscriber information transferring strategy is preset.

The subscriber information transferring strategy includes conditions for building attributes of an unspecific subscriber and conditions for building attributes of a specific subscriber. According to the conditions for building attributes of an unspecific subscriber, it is determined whether or not to add the information of an unspecific subscriber into the communication subscriber description information of a communication subject; and according to the conditions for building attributes of a specific subscriber, it is determined whether or not to add the information of a specific subscriber into the communication subscriber description information of a communication subject. The information transferring strategy has already been illustrated in detail during the description of the strategy setting module 123, so the details will not be given herein again.

Block 201: The communication record information is obtained, and it is determined whether the contact party ID information in the communication record information exists in the generated subscriber labeled information. If the contact party ID information exists in the generated subscriber labeled information, the process proceeds to Step 203; if the contact party ID information does not exist in the generated subscriber labeled information, the process proceeds to Block 202.

The communication records can be obtained in various manners, for example, reading from a database particularly for storing communication records. The actual implementation has nothing to do with the present invention, so the details will not be illustrated herein again.

Block 202: According to an information transferring strategy of an unspecific subscriber in the preset subscriber information transferring strategy, the qualified contact party ID information in the communication record information is recorded into the communication subscriber description information of a communication subject, and then the process is ended.

The contact party ID may be telephone numbers.

Block 203: According to an information transferring strategy of a specific subscriber in the preset subscriber information transferring strategy, the qualified contact party ID information in the communication record information and the subscriber labeled information corresponding to the contact party ID information are recorded into the communication subscriber description information of a communication subject.

In this block, the subscriber labeled information corresponding to the contact party ID information may be the transferable information obtained from the generated subscriber labeled information after determining that the contact party ID information in the communication record information exists in the generated subscriber labeled information in Block 201, or the transferable information obtained from the generated subscriber labeled information according to the contact party ID after the qualified conditions are determined in Block 203.

A method for recording the subscriber labeled information includes traversing preset preferential attributes in the subscriber description information of a communication subject subscriber, and determining whether the class of the subscriber labeled information exists in the preferential attributes. If the class does not exist in the preferential attributes, the class of the subscriber labeled information and transferable parameters therein are added into the preferential attributes of the communication subject subscriber. If the class exist in the preferential attributes, it is further determined whether the transferable parameters in the subscriber labeled information exist in the preferential attributes, if the transferable parameters exist in the preferential attributes, the process ends; if the transferable parameters do not exist in the preferential attributes, the transferable parameters in the subscriber labeled information are added into the preferential attributes.

Figure 3:
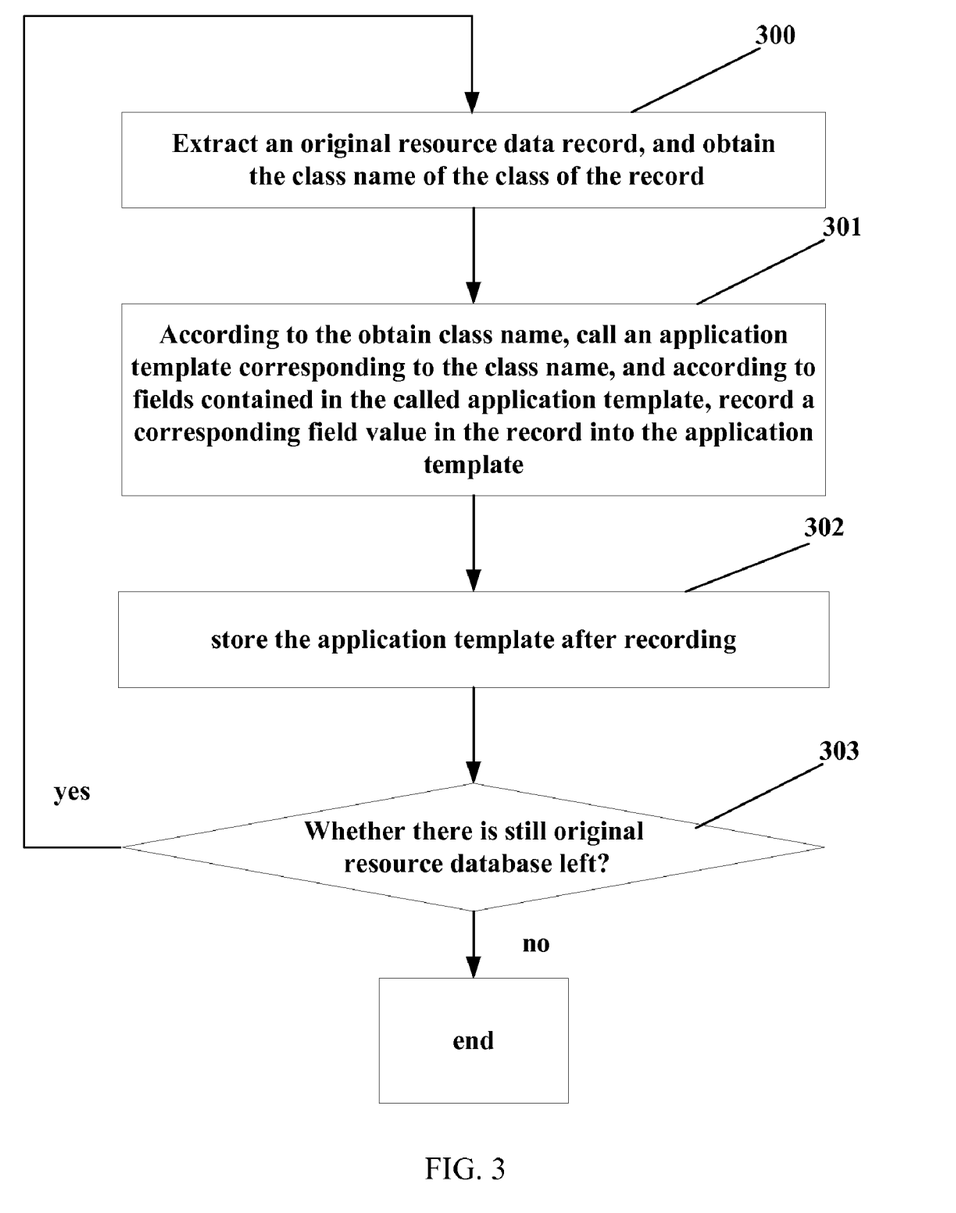
FIG. 3 is a flow chart illustrating information labeling according to an embodiment of the present invention.

In this Block, the method for generating the subscriber labeled information is shown in FIG. 3. FIG. 3 is a flow chart illustrating information labeling according to an embodiment of the present invention. The method includes the following blocks.

Block 300: An original resource data record is extracted, and the class name of the class of the record is obtained.

Herein, an original resource data record is a record in the communication record information.

Block 301: According to the obtained class name, an application template corresponding to the class name is invoked, and according to fields contained in the invoked application template, corresponding field values in the record are recorded into the application template.

In this block, the application template is preset.

If parts of the fields in the application template have no corresponding fields in the original resource data record, the following two processing methods can be adopted.

In method 1, the field is ignored, and the value of the field in the application template is set as null. The value of the field can be allocated manually by the enterprise or manager through a self-service platform.

Figure 4:
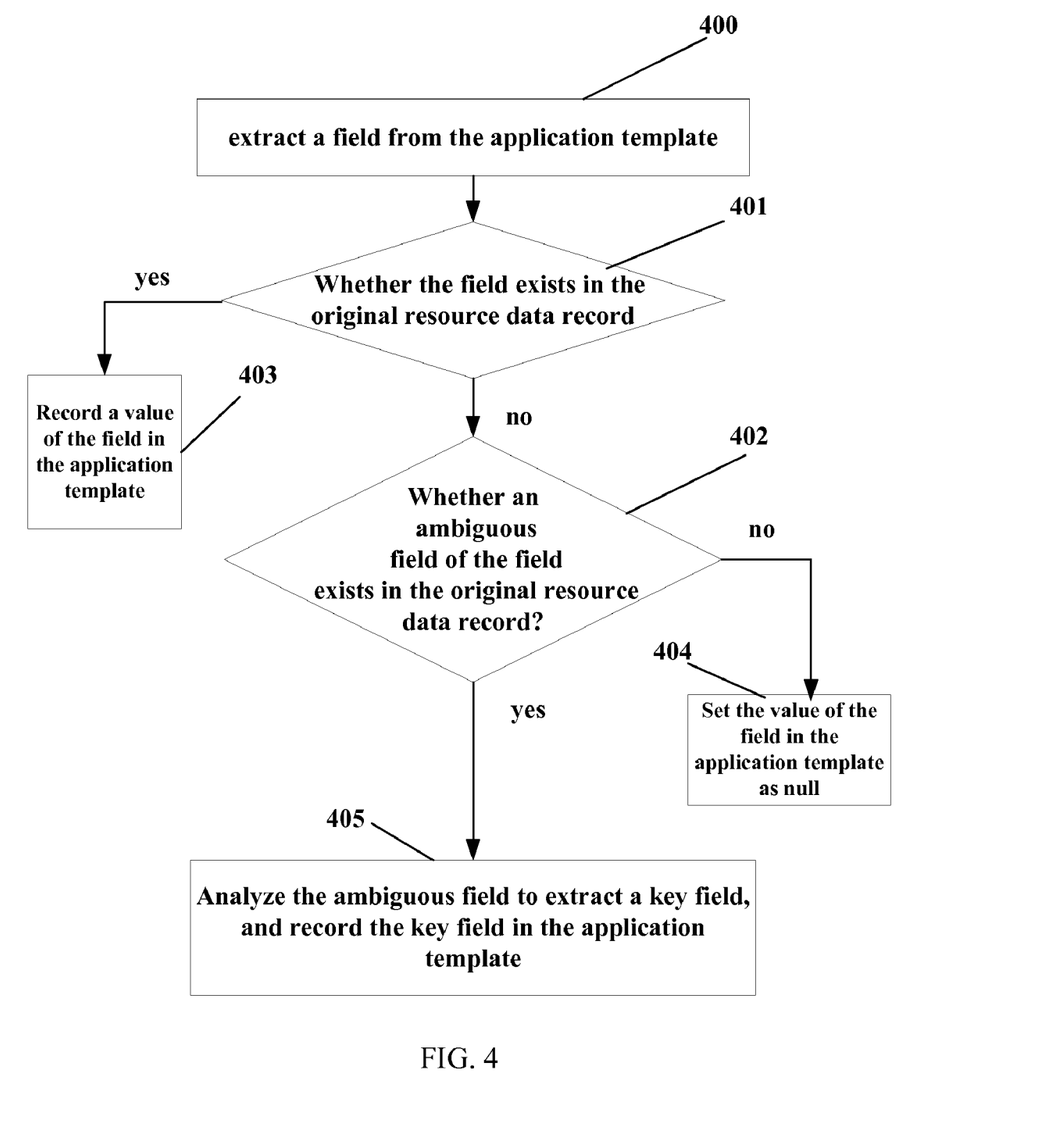
FIG. 4 is a flow chart of a method for recording a subscriber application template according to an embodiment of the present invention.

In method 2, if some fields in the application template do not have definite corresponding fields in the original resource data record, but some fields in the original resource data record may include the information required by the fields in the application template, the fields in the original resource data record that may include the information required by the fields in the application template are referred to as ambiguous fields. FIG. 4 is a flow chart of a method for recording a subscriber application template according to an embodiment of the present invention. The method includes the following blocks.

Block 400: A field is extracted from the application template.

Block 401: It is determined whether the field exists in the original resource data record. If the field exists in the original resource data record, the process proceeds to Block 405; if the field does not exist in the original resource data record, the process proceeds to Block 402.

Block 402: It is determined whether an ambiguous field exists in the original resource data record. If the ambiguous field exists in the original resource data record, the process proceeds to Block 403; if the ambiguous field does not exist in the original resource data record, the process proceeds to Block 404.

Block 403: A key field is analyzed and extracted from the ambiguous field, and a value of the key field is recorded in the application template, and the process ends.

In this block, a current segmentation can be used to perform split analysis on the ambiguous field to extract effective key words. The split analysis can be carried out in various ways, and the implementation thereof is known to those skilled in the art, so the details will not be described herein again.

In this manner, a mapping table between some fields in the application template and their corresponding ambiguous fields need to be preset in the labeling module 100. Thereby, the ambiguous fields mapping to the fields extracted from the application template can be queried through the mapping table. Meanwhile, in this manner, the labeling module 100 further has a split analysis function.

Block 404: The value of the field in the application template is set as null, and the process ends.

Block 405: The value of the field is recorded in the application template.

A mapping table is shown in Table 7 as an example for illustration:

TABLE 7

| Fields in the application template | Ambiguous fields |
| --- | --- |
| Brand | Company profile |
| Taste | Company profile |

It is assumed that a data in the original resource data record records the registration information of an auto sales company. The registration information includes the company's telephone number, name, industry, address, and profile with descriptions involving "BMW". The parameters in the invoked auto sales application template include telephone number, company name, address, and brand, and the brand field has several alternative values such as MAZDA, BMW, NISSAN, and VW. When the subscriber information is labeled, values of the telephone number, company name, and address fields extracted from the original record are written into the corresponding fields in the auto sales application template. As the brand field has no corresponding field in the original resource data record, its ambiguous field obtained from the mapping table in Table 7 is company profile. Split analysis is performed on the company profile field in the original resource data record, and "BMW" is set as a value of the brand field and written into the brand field of the auto sales application template.

Block 302: The application template after recording is stored.

Till now, the labeling of the subscriber information is finished, and the subscriber is referred to as a specific subscriber.

Block 303: It is determined whether original resource database exists. If the original resource database exists, the process returns to Step 300; otherwise, the process ends.

It can be seen from the description of the information labeling unit 10 in FIG. 1 that, the labeled specific subscriber information is stored in the specific subscriber labeling library 103.

Seen from the information labeling process in FIG. 3, a very important step is calling an application template to describe a specific subscriber. The application template is designed based on an Ontology Language. After the original resource data is written into the application template, the labeling module 100 automatically generates the labeled information file of the specific subscriber information described by the original resource data, thus finishing the attribute information labeling of the specific subscriber. Information of two auto sales companies before and after being labeled is given below for comparison. Table 8 shows the information of auto sales companies before being labeled.

TABLE 8

| Enterprise name | Telephone number | District | Address | Class | Services |
|---|---|---|---|---|---|
| SHUMYIP TOYOTA Automobile Sales & Service Co., Ltd. | 0755-26710686 | Shenzhen, Guangdong | Building 9, Maqueling Industrial Zone | Auto sales | mainly running the auto sales of TOYOTA, and also providing auto maintenance services |
| Feiyang Automobile Sales & Service Co., Ltd. | 0755-82391435 | Shenzhen, Guangdong | Building 38, Maqueling Industrial Zone | Auto sales | mainly running the auto sales of brands such as CHERY, and also providing auto insurance services |

In Table 8, the characters underlined and in boldface are key words split from the ambiguous field "Services" in the original resource data record.

After being labeled, the original resource data information is written into the application template to form the labeled information in Table 9:

TABLE 9

<specific subscriber 1>
< telephone number>0755-26710686</ telephone number>
<template name>*auto sales* </template name>
<attribute parameter>
   <Group 1:  basic attributes>
      <enterprise name>SHUMYIP TOYOTA *Automobile Sales & Service Co., Ltd.* </enterprise name>
      <district >*Shenzhen, Guangdong*</district >
      <Address>*Building 9, Maqueling Industrial Zone*</Address>
      <Postcode></Postcode>
      <Website></Website>
   </Group 1:  basic attributes>
   <Group 2:  extended attributes>
      <Brand>TOYOTA </Brand>
      <service items>*auto sales, auto maintenance*</service items>
   </Group 2:  extended attributes>
</attribute parameter>
</specific subscriber 1>
<specific subscriber 2>
< telephone number>*0755-82391435*</ telephone number>
<template name>*auto sales* </template name>
<attribute parameter>
   <Group 1:  basic attributes>
      <enterprise name>*Feiyang Automobile Sales & Service Co., Ltd.*</enterprise name>
      <district>*Shenzhen, Guangdong*</district>

TABLE 9-continued

<Address>*Building 38, Maqueling Industrial Zone*</Address>
      <Postcode></Postcode>
      <Website></Website>
   </Group 1:  basic attributes>
   <Group 2:  extended attributes>
      <Brand>*CHERY*</Brand>
      <service items>*auto sales, auto insurance*</service items>
   </Group 2:  extended attributes>
</attribute parameter>
</specific subscriber 2>

In Table 9, the italic characters are labeled information.

Further, if the obtained communication record information does not include the fields described in the restrictions of the subscriber information transferring strategy, the method of the present invention may further preprocess the communication records, i.e., extract a preset target field from the original communication record fields to form a new record and store the new record. The target field at least includes a communication subject ID field identifying the owner of the communication records, a contact party ID field identifying the communication objects, and an additional field generated by processing the communication record according to preset requirements.

The target field is set by a manager in a way varied with the format of the communication records. An example of preprocessing an original phone bill is shown below for illustrating a preprocessing method.

Assuming a phone bill of a subscriber 13526843612 for the first ten days in June is shown in Table 10:

TABLE 10

| Ser. No. | Subscriber number | Place of the call | Type of the calling/called party | Type of the call | Counterpart's number | Date of the call | Time of the call | Duration of the call | Mobile phone charge | Toll call charge |
|---|---|---|---|---|---|---|---|---|---|---|
| 1 | 13526843612 | 755 | Calling party | Local | 13343857303 | 2006-6-1 | 17:13 | 00:12:23 | / | / |
| 2 | 13526843612 | 755 | Calling party | Local | 13343857303 | 2006-6-1 | 23:00 | 00:45:56 | / | / |
| 3 | 13526843612 | 755 | Called party | Local | 13343857303 | 2006-6-1 | 19:00 | 00:09:48 | / | / |
| 4 | 13526843612 | 755 | Calling party | Local | 0755-26710686 | 2006-6-5 | 09:30 | 00:15:33 | / | / |
| 5 | 13526843612 | 755 | Calling party | Local | 0755-26710686 | 2006-6-8 | 14:30 | 00:05:53 | / | / |
| 6 | 13526843612 | 755 | calling party | Local | 0755-82391435 | 2006-6-8 | 15:30 | 00:03:53 | / | / |
| 7 | 13526843612 | 755 | Calling party | Local | 0755-82391435 | 2006-6-9 | 08:30 | 00:05:53 | / | / |
| 8 | 13526843612 | 755 | Called party | Local | 13892983773 | 2006-6-9 | 10:30 | 00:02:26 | / | / |
| 9 | 13526843612 | 755 | Called party | Local | 13343857303 | 2006-6-10 | 12:00 | 00:09:12 | / | / |

It is assumed that the preprocessing is performed on the format of the original phone bill, and the set target fields include subscriber number, serial number, and counterpart's number, i.e., a contact party ID field. The aforementioned processing on the communication records according to requirements is to consolidate the bill records under the same counterpart's number, and the added additional fields include the number of calls and total call duration. The new records formed after consolidating are shown in Table 11:

TABLE 11

| Subscriber number | Ser. No. | Counterpart's number | Number of calls | Total call duration |
|---|---|---|---|---|
| 13526843612 | 1 | 13343857303 | 4 | 01:17:19 |
| 13526843612 | 2 | 13892983773 | 1 | 00:02:26 |
| 13526843612 | 3 | 0755-26710686 | 2 | 00:21:26 |
| 13526843612 | 4 | 0755-82391435 | 2 | 00:09:46 |

Assuming that it is possible to obtain the distance of a call by some means, the call distance may well serve as a parameter to determine the degree of relationship between the two parties in communication.

Figure 5:
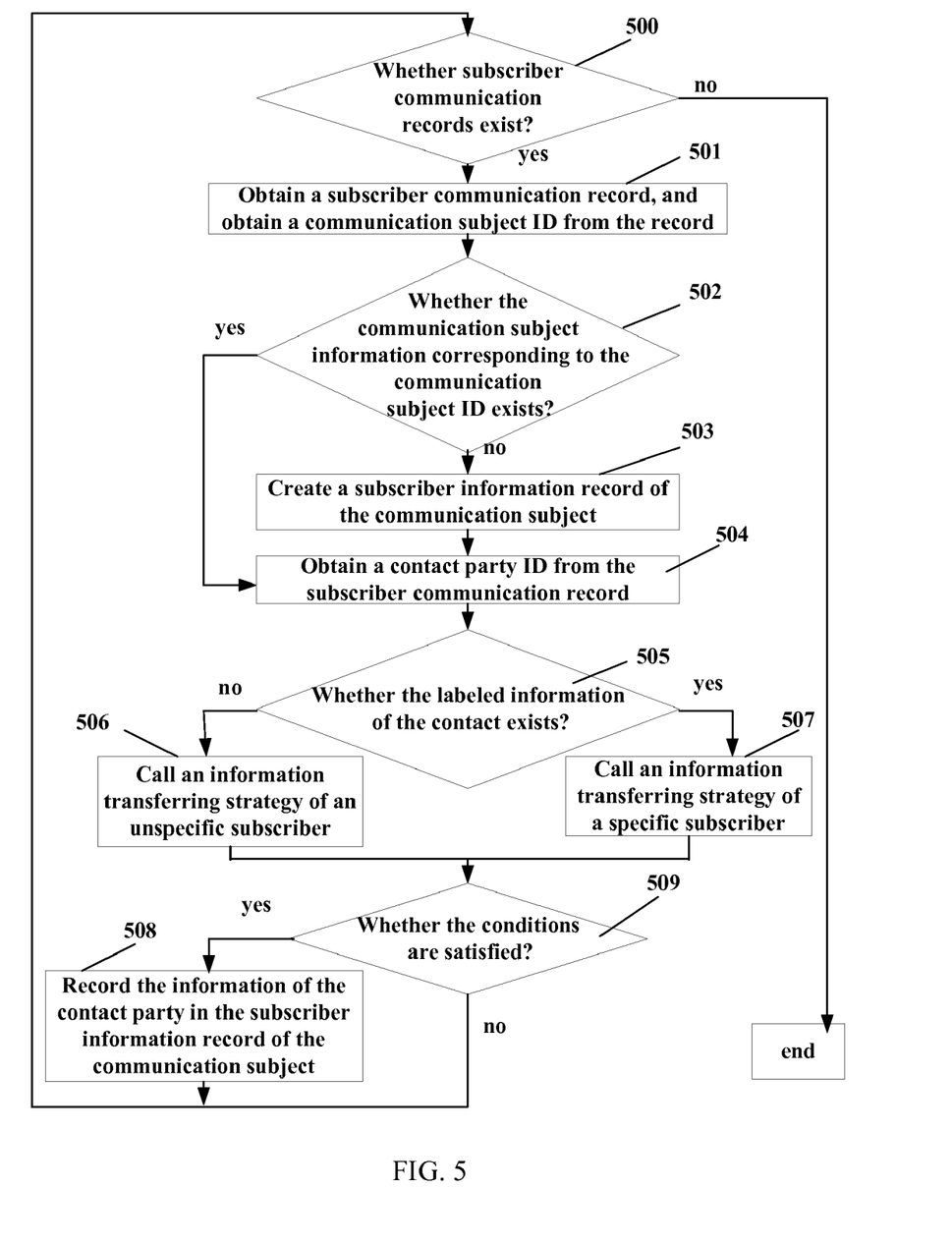
FIG. 5 is a flow chart of an embodiment of the present invention.

An example for illustrating the generation process of the subscriber information is shown below with reference to FIG. 1. FIG. 5 is a flow chart of an embodiment the present invention, including the following blocks.

Block 500: It is determined whether subscriber communication records exist. If subscriber communication records exist, the process proceeds to Block 501; if subscriber communication records do not exist, the process ends.

Herein, it is assumed that the subscriber information generating module 120 extracts a group of preprocessing bills from the new record library 111, as shown in Table 12. The subscriber number is the communication subject ID field, and the counterpart's number is the contact party ID field. Therefore, the determination result of this block is that the subscriber communication records exist.

TABLE 12

| Subscriber number | Ser. No. | Counterpart's number | Number of calls | Total call duration |
|---|---|---|---|---|
| 13526843612 | 1 | 13343857303 | 4 | 01:17:19 |
| 13526843612 | 2 | 13892983773 | 1 | 00:02:26 |
| 13526843612 | 3 | 0755-26710686 | 2 | 00:21:26 |
| 13526843612 | 4 | 0755-82391435 | 2 | 00:09:46 |

Blocks 501-503: A subscriber communication record is obtained, and a communication subject ID is obtained from the record. It is determined whether the communication subject information mapping to the communication subject ID exists. If the communication subject information exists, the process proceeds to Block 504; if the communication subject information does not exist, a subscriber information record of the communication subject is created.

In this step, it is assumed that a subscriber communication record extracted by the subscriber information generating module 120 is as shown in Table 13.

TABLE 13

| Subscriber number | Ser. No. | Counterpart's number | The number of calls | Total call duration |
|---|---|---|---|---|
| 13526843612 | 1 | 13343857303 | 4 | 01:17:19 |

The subscriber information generating module 120 traverses the subscriber information base 121, and determines whether the subscriber number 13526843612 is recorded in the subscriber information base 121. If the subscriber number 13526843612 is not recorded in the subscriber information base 121, a subscriber information record file (as shown in Table 4) of the subscriber is created, i.e., generating a null subscriber description information record for the subscriber 13526843612 in the subscriber information base.

Block 504: A contact party ID is obtained from the subscriber communication record.

The subscriber information generating module 120 reads a contact party ID number of the communication record shown in Table 13, i.e., the counterpart's number 13343857303.

Block 505: It is determined whether the labeled information of the contact party exists. If the labeled information exists, the process proceeds to Step 507; if the labeled information does not exist, the process proceeds to Step 506.

In this block, it is assumed that the subscriber information generating module 120 traverses the specific subscriber labeling library 103, and finds out by query that the counterpart's number 13343857303 has not been labeled.

Block 506: An information transferring strategy of an unspecific subscriber is invoked, and the process proceeds to Block 508.

In this block, it is assumed that the information transferring strategy of the unspecific subscriber called by the subscriber information generating module 120 from the strategy pool 122 is: IP={(the number of calls>3)∩(total call duration>00:30:00)}.

Block 507: An information transferring strategy of a specific subscriber is invoked.

Block 508: It is determined whether the conditions are satisfied. If the conditions are satisfied, the process proceeds to Block 509; if the conditions are not satisfied, the process returns to Block 500.

In this block, according to the fields described in the information transferring strategy IP of the unspecific subscriber, the subscriber information generating module 120 reads the number of calls and total call duration in the subscriber communication record shown in Table 13 in sequence, so as to determine whether the conditions set in IP are satisfied.

Apparently, in this embodiment, seen from Table 13, the number of calls is four, and the total call duration is 01:17:19, both meeting the conditions set in IP that the number of calls>3 and the total call duration>00:30:00.

Block 509: The information of the contact party is recorded, and the process returns to Block 500.

The contact party 13343857303 is added into the subscriber description information of 13526843612.

A contact weight of the contact party can be further generated and recorded. It is assumed that the contact weight is a ratio of the number of calls with the contact party in the total number of calls during a period of time. As shown in Table 12, in a period of four records, the contact weight of the contact party 13343857303 is $$S = \frac{4}{4+1+2+2} = \frac{4}{9}.$$

Through the above processes, the information of the unspecific subscriber 13343857303 serves as the subscriber description information of the communication subject 13526843621.

In the same way, a second record is extracted, and it is assumed that the queried counterpart's number 13892983773 in the second record is an unspecific subscriber. Seen from the process of FIG. 5, similarly, an information transferring strategy of an unspecific subscriber is called, and it can be found out that the number of calls in the second record is once and the total call duration is 00:02:26, which do not meet the conditions set in IP, so this bill record should be ignored and abandoned.

A third record is extracted, and it is assumed that the queried counterpart's number 0755-26710686 in the third record is a specific subscriber. The contact party 0755-26710686 belongs to the auto sales class, and the labeled information of the contact party is shown in Table 9. Seen from the process of FIG. 5, in Step 507, the specific subscriber labeling library 103 reads the application template name of 0755-26710686 from the labeled information, and invokes an information transferring strategy of a specific subscriber mapping to the application template from the strategy pool 122. It is assumed that the information transferring strategy of the specific subscriber is: I={(the number of calls>1)}. Seen from the third record, the number of calls made between the subscriber number 13526843612 and the counterpart's number 0755-26710686 are two, which meets the condition set in I, i.e., the number of calls>1. Therefore, the information of the contact party 0755-26710686 is added into the subscriber description information of the communication subject 13526843612. Herein, it should be noted that, besides adding the counterpart's number 0755-26710686 into the subscriber description information of the communication subject 13526843612, transferable parameters in the corresponding subscriber labeled information of the counterpart's number 0755-26710686 is also added.

Further, a contact weight of the contact party is generated and recorded. It is assumed that the contact weight is a ratio of the number of calls with the contact party in the total number of calls during a period of time. As shown in Table 12, in a period of four records, the contact weight of the contact party 0755-26710686 is $$S = \frac{2}{4+1+2+2} = \frac{2}{9}.$$

As the contact party 0755-26710686 is a labeled specific subscriber, a method for recording the transferable parameters in the corresponding subscriber labeled information of the counterpart's number 0755-26710686 is adding corresponding preferential attributes in the subscriber description information. In particular, the method includes traversing the preferential attributes of the communication subject subscriber, and determining whether the preferential attributes of the communication subject subscriber include attribute records of the auto sales class. In this embodiment, assuming that it is the first time for the communication subject subscriber to contact a specific subscriber of the auto sales class, the auto sales class records and corresponding transferable parameters are directly added into the subscriber preferential attributes. And in this embodiment, it is assumed that the transferable parameters in the auto sales template are brand and services.

A fourth record is extracted. It is assumed that the contact party 0755-82391435 belongs to the auto sales class, and the labeled information of the contact party is shown in Table 9. The processing flow is identical to the third record and only varies in adding the preferential attributes. As the preferential attribute records of the auto sales class already exist, when the record is processed, it needs to determine whether the transferable parameters in the labeled information of the contact party 0755-82391435 exist in the preferential attribute records. If the transferable parameters exist in the preferential attribute records, no operation will be performed, or the transferable parameters in the labeled information of the contact party 0755-82391435 are added to overwrite the original records; otherwise, the transferable parameters in the labeled information of the contact party 0755-82391435 are added into the preferential attributes, so as to update the preferential attributes.

According to the process in FIG. 5, after the four records in Table 12 are processed, the description information of the subscriber is generated as shown in Table 14:

TABLE 14

```
<subscriber 1>
    <number>13526843612</number>
    < social relationship attributes>
        <unspecific subscriber>
            <unspecific subscriber 1>
                <number>13343857303</number>
                    <contact weight>4/9</contact weight>
            </unspecific subscriber 1>
        </unspecific subscriber>
        <specific subscriber>
            <specific subscriber 1>
                <number>0755-26710686</number>
                    <name>SHUMYIP TOYOTA Automobile Sales &
Service Co., Ltd. </name>
                <contact weight>2/9</contact weight>
            </specific subscriber 1>
            <specific subscriber 2>
                <number>0755-82391435</number>
                    <name>Feiyang Automobile Sales & Service Co.,
Ltd.</name>
                <contact weight>2/9</contact weight>
            </specific subscriber 2>
        </specific subscriber>
    </ social relationship attributes>
    <preferential attribute>
        <application template 1>
            <template name>auto sales </template name>
            <brand>TOYOTA, CHERY </Brand>
                <service items>auto sales, auto maintenance, auto
insurance</service items>
        </application template 1>
    </preferential attribute>
</subscriber 1>
```

The phone bill above is only taken as an embodiment for illustration. The scheme of the present invention is also applicable to communication modes like Email and IM, for example, labeling the enterprise Email and IM numbers. Moreover, the scheme of the present invention is also applicable to data services process like ring back tone (RBT) download. For example, the present invention can be used for creating ontology description templates corresponding to various RBTs, labeling the RBTs provided by service providers (SPs) as specific subscribers, and analyzing the subscriber description information in service records of the subscriber data services.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for generating communication subscriber description information in a communication network, comprising presetting, in a server or a user terminal, a subscriber information transferring strategy for determining whether or not to add contact party information into communication subscriber description information of a communication subject, the method further comprising:

obtaining communication record information, and determining whether the contact party identification (ID) information in the communication record information exists in generated subscriber labeled information, if the contact party identification (ID) information in the communication record information does not exist in generated subscriber labeled information, recording, according to an information transferring strategy of an unspecific subscriber in the preset subscriber information transferring strategy, the qualified contact party ID information in the communication record information into the communication subscriber description information of the communication subject;

wherein the contact party information comprises the contact party identification (ID) information and subscriber labeled information corresponding to the contact party ID information;

wherein if a field described in conditions of the subscriber information transferring strategy does not exist in the obtained communication record information, before determining whether the contact party ID information in the communication record information exists in the generated subscriber labeled information, the method further comprises:

extracting a preset target field from fields of the obtained communication record, generating an additional field through processing the communication record information according to a preset requirement, and forming new communication record information.

2. The method according to claim 1, wherein an application template describing a class and class attributes of the application is respectively preset for different applications, and the method for generating the subscriber labeled information comprises:

extracting an original resource data record, and obtaining the class name of the class of the original resource data record;

invoking, according to the obtained class name, an application template corresponding to the class name, and recording, according to fields contained in the invoked application template, a corresponding field value in the record into the application template; and storing the application template after recording.

3. The method according to claim 2, wherein if parts of the fields in the application template do not exist in the original resource data record, the method for recording the corresponding field value in the original resource data record into the application template comprises setting the field value in the application template as null.

4. The method according to claim 2, wherein if parts of the fields in the application template do not exist in the original resource data record, the method for recording the corresponding field value in the original resource data record into the application template comprises:

presetting a mapping table between the fields in the application template and their corresponding ambiguous fields; and querying the mapping table to determine whether an ambiguous field of the field in the application template exists in the original resource data record, and if the ambiguous field of the field in the application template exists in the original resource data record, analyzing and extracting a key field from the ambiguous field, and recording a value of the key field in the corresponding field of the application template; if the ambiguous field of the field in the application template does not exist in the original resource data record, setting the value of the field in the application template as null.

5. The method according to claim 4, wherein a method for analyzing and extracting the key field is split analysis.

6. The method according to claim 1, further comprising:

building, in the communication subscriber description information, contact frequency or intimacy between the communication subject and an unspecific subscriber or a specific subscriber according to a preset composite operation relationship of a designated field.

7. The method according to claim 2, wherein the application template is created on the basis of an Ontology Language.

8. The method according to claim 7, wherein the application template comprises an application template name and application template parameters describing related class attributes of the class indicated by the application template name.

9. A method for generating communication subscriber description information in a communication network, comprising presetting, in a server or a user terminal, a subscriber information transferring strategy for determining whether or not to add contact party information into communication subscriber description information of a communication subject, the method further comprising:

obtaining communication record information, and determining whether the contact party identification (ID) information in the communication record information exists in generated subscriber labeled information, wherein the contact party information comprises the contact party identification (ID) information and subscriber labeled information corresponding to the contact party ID information;

wherein if the contact party ID information in the communication record information exists in the generated subscriber labeled information, the recording the qualified contact party information in the communication record information into communication subscriber description information comprises:

traversing preset preferential attributes in the subscriber description information of the communication subject subscriber to determine whether a class of the subscriber labeled information exists in the preferential attributes;

if the class of the subscriber labeled information does not exist in the preferential attributes, adding the class of the subscriber labeled information and transferable parameters into the preferential attributes of the communication subject subscriber; and if the class of the subscriber labeled information exists in the preferential attributes, determining whether the transferable parameters in the subscriber labeled information exist in the preferential attributes, and adding the transferable parameters in the subscriber labeled information into the preferential attributes if the transferable parameters in the subscriber labeled information do not exist in the preferential attributes.

* * * * *